US011148488B2

(12) United States Patent
Niewiadomski et al.

(10) Patent No.: US 11,148,488 B2
(45) Date of Patent: Oct. 19, 2021

(54) SYSTEM AND METHOD FOR POSITIONING A VEHICLE WITH REDUCED VARIATION

(71) Applicant: Ford Global Technologies, LLC, Dearborn, MI (US)

(72) Inventors: Luke Niewiadomski, Hamtramck, MI (US); Shannon Brooks-Lehnert, Ann Arbor, MI (US); Roger Arnold Trombley, Ann Arbor, MI (US); Kenneth Michael Mayer, Ypsilanti, MI (US); Chen Zhang, San Jose, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 360 days.

(21) Appl. No.: 16/019,032

(22) Filed: Jun. 26, 2018

(65) Prior Publication Data

US 2019/0389262 A1 Dec. 26, 2019

(51) Int. Cl.

| | |
|---|---|
| ***B60D 1/36*** | (2006.01) |
| ***B60R 1/00*** | (2006.01) |
| ***B62D 15/02*** | (2006.01) |
| ***B60R 11/04*** | (2006.01) |
| *B62D 5/04* | (2006.01) |
| *B60D 1/06* | (2006.01) |

(52) U.S. Cl.

CPC ................ *B60D 1/36* (2013.01); *B60R 1/003* (2013.01); *B60R 11/04* (2013.01); *B62D 15/025* (2013.01); *B60D 1/06* (2013.01); *B60R 2300/808* (2013.01); *B62D 5/0463* (2013.01)

(58) Field of Classification Search

CPC .. B60D 1/36; B60D 1/06; B60R 1/003; B60R 11/04; B60R 2300/808; B62D 15/025; B62D 5/0463

USPC .......................................................... 280/477

See application file for complete search history.

(56) References Cited

U.S. PATENT DOCUMENTS

| | | | | |
|---|---|---|---|---|
| 4,281,736 | A | 8/1981 | Lizzio | |
| 5,695,020 | A | 12/1997 | Nishimura | |
| 5,951,035 | A | 9/1999 | Phillips, Jr. et al. | |
| 6,679,810 | B1 * | 1/2004 | Boll | B60T 7/122 477/195 |
| 6,801,125 | B1 * | 10/2004 | McGregor | B62D 15/029 180/168 |
| 9,102,271 | B2 | 8/2015 | Trombley et al. | |
| 2004/0226768 | A1 | 11/2004 | DeLuca et al. | |
| 2005/0246081 | A1 | 11/2005 | Bonnet et al. | |
| 2013/0226390 | A1 * | 8/2013 | Luo | B60D 1/36 701/25 |

(Continued)

FOREIGN PATENT DOCUMENTS

WO 2013130479 A1 9/2018

*Primary Examiner* — Jacob D Knutson

(74) *Attorney, Agent, or Firm* — Raymond Coppiellie; Price Heneveld LLP

(57) ABSTRACT

A vehicle system is configured to control a trailer alignment routine. The system comprises a hitch ball mounted on a vehicle and a controller configured to identify a coupler position of a trailer. The controller is further configured to control motion of the vehicle to an aligned position, wherein the hitch ball is aligned with the coupler position. In response to the aligned position, the controller activates a service brake holding the vehicle and while maintaining the service brake activation, the controller activates a parking brake.

16 Claims, 6 Drawing Sheets

(56) References Cited

U.S. PATENT DOCUMENTS

| | | | | |
|---|---|---|---|---|
| 2014/0149011 | A1* | 5/2014 | Eberling | B60T 8/1708 701/70 |
| 2017/0072959 | A1* | 3/2017 | Bergin | B60W 30/143 |
| 2018/0086322 | A1* | 3/2018 | Zula | B60K 37/06 |
| 2018/0154726 | A1* | 6/2018 | Fida | B60G 17/017 |
| 2018/0312022 | A1* | 11/2018 | Mattern | G05D 1/0225 |
| 2020/0064825 | A1* | 2/2020 | Woodley | B60T 7/12 |

* cited by examiner 12
60
60c
54
50
40
10
72
66

16
24
96
42
18
60a
26
18
22
80
U

SYSTEM AND METHOD FOR POSITIONING A VEHICLE WITH REDUCED VARIATION

FIELD OF THE DISCLOSURE

The present disclosure generally relates to a system for assisting in a vehicle-trailer hitching operation. In particular, the present disclosure relates to a system configured to accurately position and stop a vehicle in alignment with a trailer.

BACKGROUND OF THE DISCLOSURE

Hitching a trailer to a vehicle can be a difficult and time-consuming experience. In particular, aligning a vehicle hitch ball with the desired trailer hitch can, depending on the initial location of the trailer relative to the vehicle, require repeated forward and reverse driving coordinated with multiple steering maneuvers to appropriately position the vehicle. Further, through a significant portion of the driving needed for appropriate hitch ball alignment, the trailer hitch cannot be seen, and the hitch ball can, under ordinary circumstances, never actually be seen by the driver. This lack of sight lines requires an inference of the positioning of the hitch ball and hitch based on experience with a particular vehicle and trailer, and can still require multiple instances of stopping and stepping out of the vehicle to confirm alignment or to note an appropriate correction for a subsequent set of maneuvers. Even further, the closeness of the hitch ball to the rear bumper of the vehicle means that any overshoot can cause a collision of the vehicle with the trailer. Accordingly, further advancements may be desired.

SUMMARY OF THE DISCLOSURE

According to one aspect of the present disclosure, a vehicle system configured to control a trailer alignment routine is disclosed. The system comprises a hitch ball mounted on a vehicle and a controller configured to identify a coupler position of a trailer. The controller is further configured to control motion of the vehicle to an aligned position, wherein the hitch ball is aligned with the coupler position. In response to the aligned position, the controller activates a service brake holding the vehicle and while maintaining the service brake activation, the controller activates a parking brake.

Embodiments of the first aspect of the invention can include any one or a combination of the following features:

- the service brake is applied maintaining the aligned position, thereby preventing a drift in a transmission of the vehicle in a parked configuration;
- the controller is configured to control a transmission of the vehicle to engage a parking configuration;
- a display system and a user interface, wherein the controller is configured to control the trailer alignment routing in response to at least one input received via the user interface;
- the controller is configured to display an instruction prompting an operator of the vehicle to shift the vehicle into park while maintaining the service brake activation;
- the controller is configured to release the service brake in response to the activation of the parking brake and a transmission in a parking configuration;
- a sensor apparatus in communication with the controller, wherein the sensor apparatus is configured to scan a region proximate the vehicle and detect the coupler position of a coupler of the trailer;
- the sensor apparatus comprises an imaging system including one or more cameras mounted on the vehicle; wherein the controller identifies the coupler position based on image data received from the imaging system comprising position data of the coupler;
- a brake system comprising the service brake and the parking brake, wherein the controller is further configured to automatically control the brake system to control the alignment routine;
- a steering system comprising a steering motor configured to maneuver a steered wheel of the vehicle, wherein the controller is further configured to control the steering motor to maneuver the vehicle according to the alignment routine; and
- the coupler position is a location of a coupler of the trailer, wherein the coupler is configured to mate to the hitch ball in a towing configuration.

According to another aspect of the present disclosure, a method for controlling a vehicle is disclosed. The method comprises identifying a coupler position of a trailer in sensor data and controlling motion of the vehicle to an aligned position aligning the hitch ball with the coupler position. In response to reaching the aligned position, the method continues by holding the vehicle by activating a service brake. While maintaining the service brake activation, the method controls the vehicle to sustain the aligned position.

According to another aspect of the present disclosure, a vehicle system is disclosed. The system is configured to control a trailer alignment routine. The system comprises a hitch ball mounted on a vehicle and a controller configured to identify a coupler position of a trailer. The controller is further configured to control motion of the vehicle to an aligned position, wherein the hitch ball is aligned with the coupler position. In response to the aligned position, the controller is configured to hold the vehicle by activating a service brake. The service brake is applied maintaining the aligned position, thereby preventing a drift in a transmission of the vehicle in a parked configuration. While maintaining the service brake activation, the controller is further configured to activate the parking brake and control a transmission of the vehicle to engage a parking configuration.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
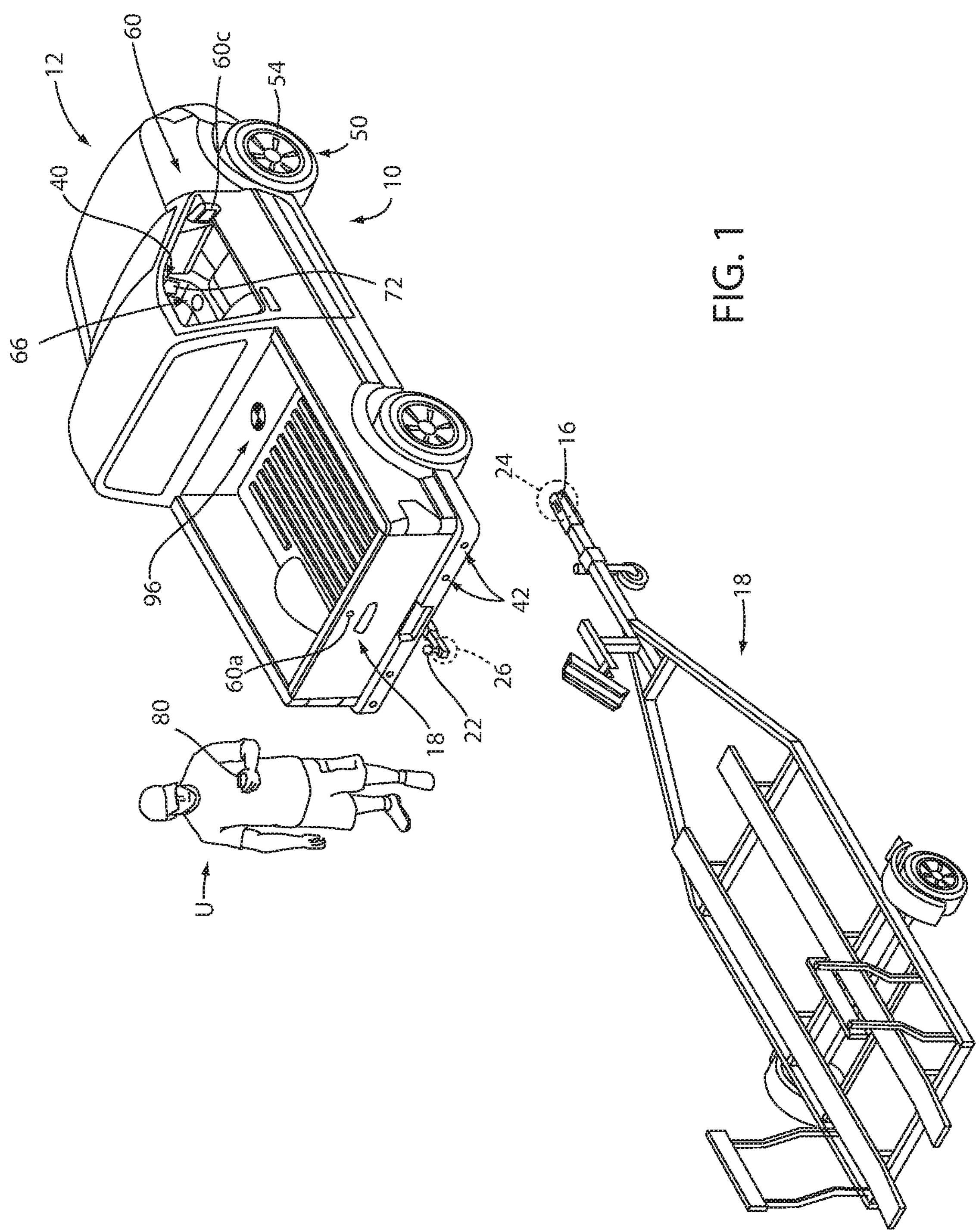
FIG. 1 is a perspective view of a vehicle in an unhitched position relative to a trailer.

For purposes of description herein, the terms "upper," "lower," "right," "left," "rear," "front," "vertical," "horizontal," "interior," "exterior," and derivatives thereof shall relate to the device as oriented in FIG. 1. However, it is to be understood that the device may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature or component extending in or along a given direction, or the like, does not mean that the feature or component follows a straight line or axis in such a direction or that it only extends in such direction or on such a plane without other directional components or deviations, unless otherwise specified.

Referring generally to FIGS. 1-4, reference numeral 10 designates a hitch assistance system (also referred to as a "hitch assist" system) for a vehicle 12. In various embodiments, hitch assist system 10 includes a controller 14 configured to acquire position data of a coupler 16 of a trailer 18. The controller 14 may be configured to derive a vehicle path 20 to align a hitch ball 22 of the vehicle 12 with the coupler 16. Deriving the vehicle path 20 may include a variety of steps including detecting and compensating for a change in a coupler position 24 in order to control the vehicle 12 to locate a hitch position 26 aligned with the coupler 16. The vehicle path 20 may comprise a plurality of segments 28, which may correspond to changes in the operating direction or steering direction of the vehicle 12. In various embodiments, deriving the vehicle path 20 may include navigating around intervening objects or structures, operating over uneven terrain, following a desired path indicated by an operator or user U, etc. Accordingly, the disclosure may provide for the hitch assist system 10 to provide for improved navigation of the vehicle 12 and/or interaction with the coupler 16 such that trailer 18 may be effectively connected to the vehicle 12 without complication.

In some embodiments, the hitch assist system 10 may be configured to control the vehicle 12 to initiate an automated vehicle stop routine. The controller 14 may apply the vehicle stop routine to stop the vehicle 12 and accurately position the hitch ball 22 in alignment with the coupler 16. For example, during a guided or automated operation of the vehicle 12, the controller 14 may control the motion of the vehicle 12 along the vehicle path 20 such that the hitch ball 22 of the vehicle 12 is aligned with the coupler 16. However, if the service brakes of the vehicle 12 are released by the controller 14, the vehicle 12 may lurch or roll, which may result in the hitch ball 22 no longer being aligned with the coupler 16. Accordingly, the system 10 may be configured to apply the automated vehicle stop routine to accurately position the vehicle 12 and maintain the position of the hitch ball 22 in alignment with the coupler 16 while the vehicle 12 is connected to the coupler 16. A detailed description of the automated vehicle stop routine is further discussed in reference to FIGS. 5 and 6.

Figure 2:
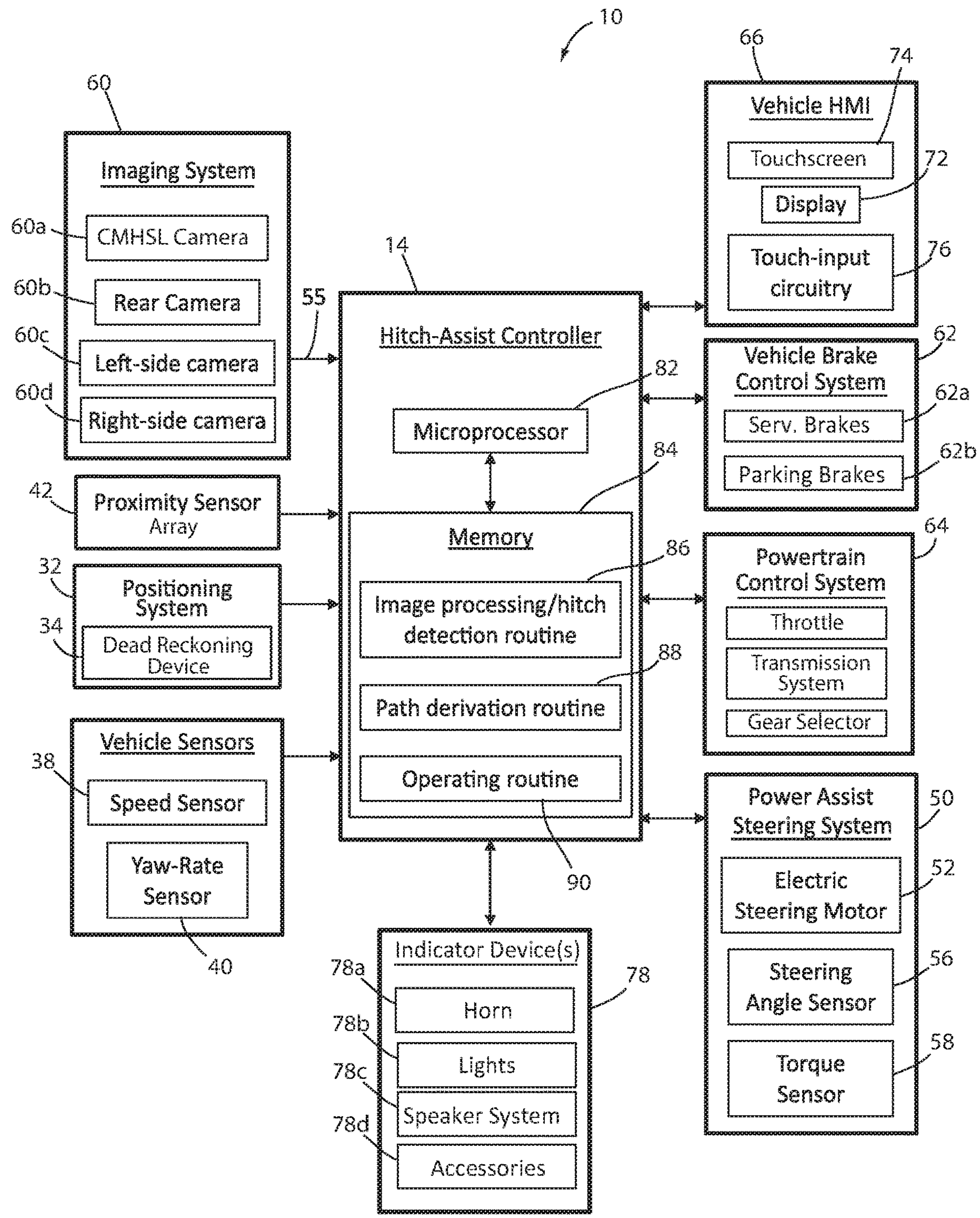
FIG. 2 is a diagram of a system according to an aspect of the disclosure for assisting in aligning the vehicle with a trailer in a position for hitching the trailer to the vehicle.
Figure 3:
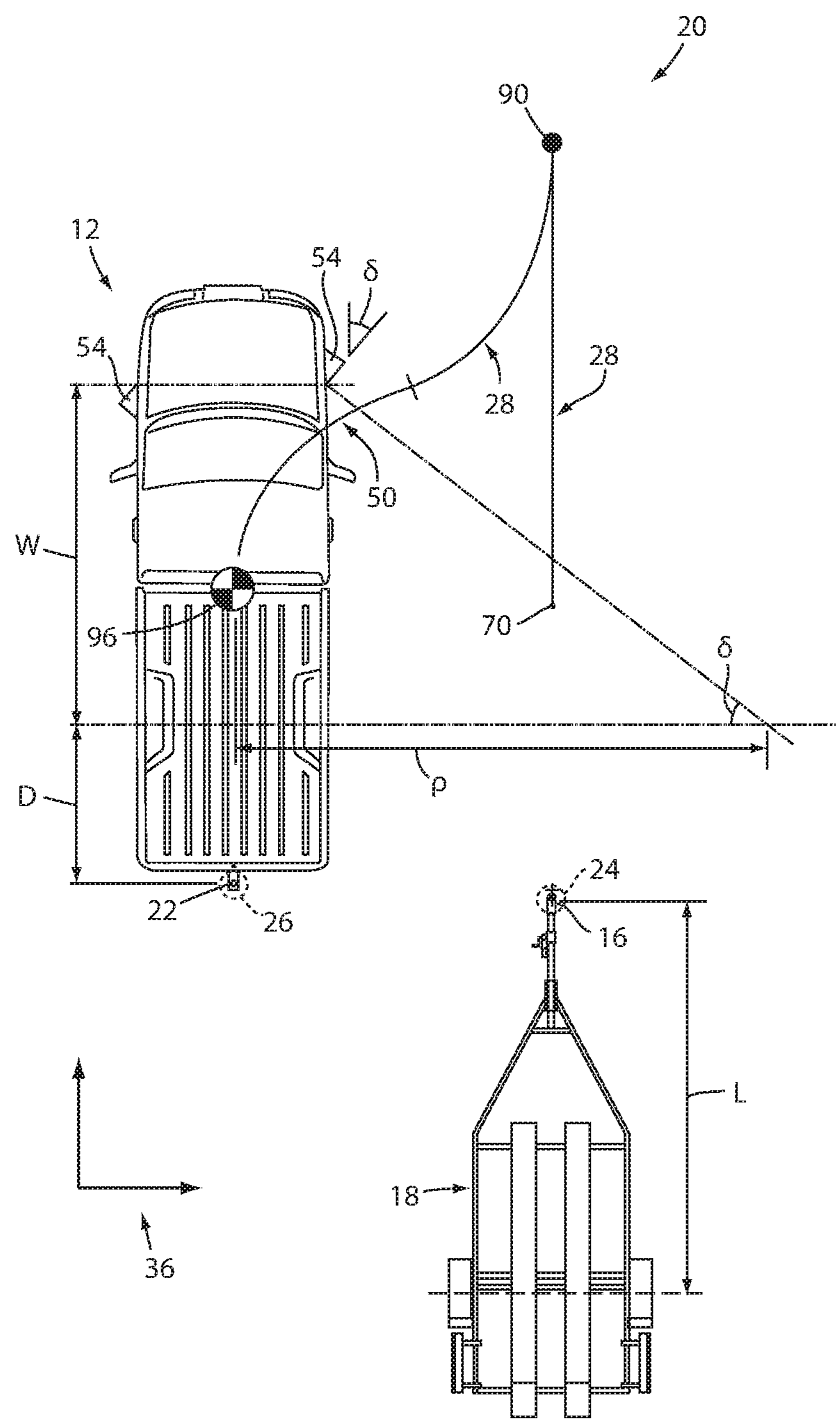
FIG. 3 is an overhead schematic view of a vehicle during a step of the alignment sequence with the trailer.
Figure 4:
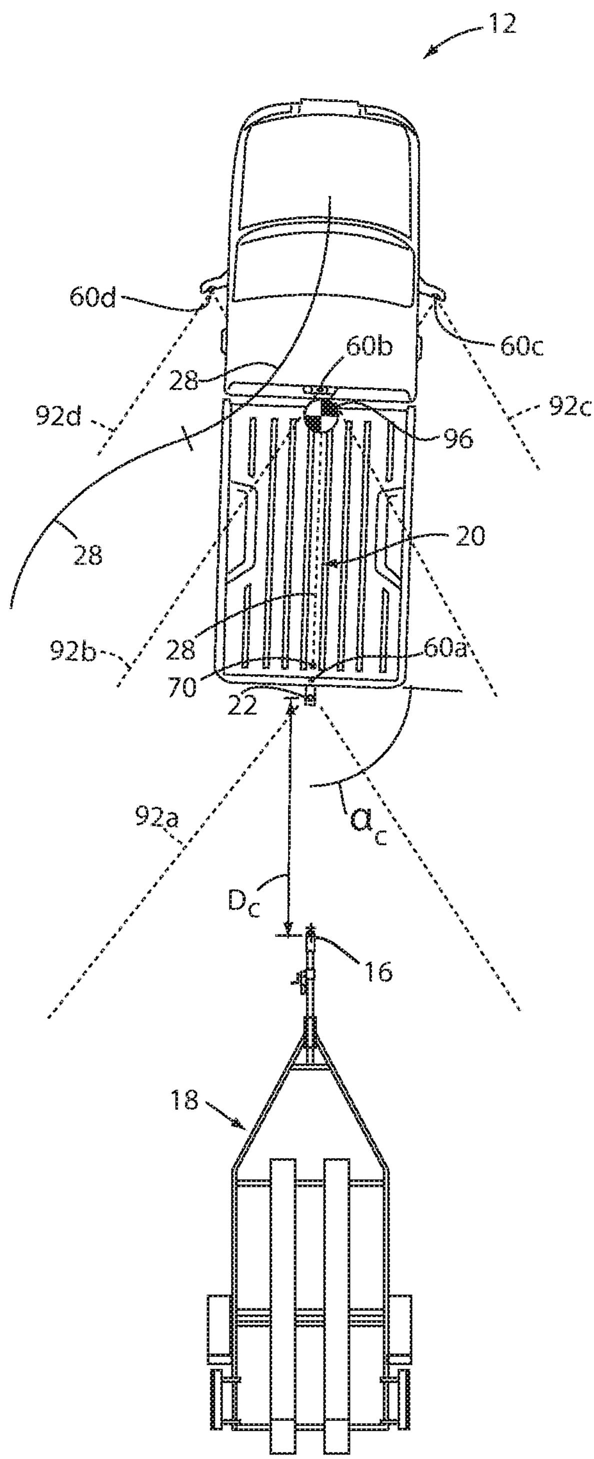
FIG. 4 is a is an overhead schematic view of a vehicle during a step of the alignment sequence with the trailer.

With respect to the general operation of the hitch assist system 10, as illustrated in the system diagram of FIGS. 2-4, the system 10 includes various sensors and devices that obtain or otherwise provide vehicle status-related information. This information includes positioning information from a positioning system 32, which may include a dead reckoning device 34 or, in addition or as an alternative, a global positioning system (GPS), to determine a coordinate location of the vehicle 12 based on the one or more locations of the devices within the positioning system 32. In particular, the dead reckoning device 34 can establish and track the coordinate location of the vehicle 12 within a localized coordinate system 36 based at least on vehicle speed and steering angle δ as shown in FIG. 3. Other vehicle information received by hitch assist system 10 may include a speed of the vehicle 12 from a speed sensor 38 and a yaw rate of the vehicle 12 from a yaw rate sensor 40. It is contemplated that in additional embodiments, a proximity sensor 42 or an array thereof, and other vehicle sensors and devices may provide sensor signals or other information, such as sequential images of the trailer 18, including the detected coupler 16, that the controller 14 of the hitch assist system 10 may process with various routines to determine the height H and position (e.g., based on the distance $D_c$ and angle $\alpha_c$) of coupler 16.

As further shown in FIG. 2, one embodiment of the hitch assist system 10 is in communication with the steering system 50 of vehicle 12. The steering system 50 may be a power assist steering system 50 including a steering motor 52 to operate the steered wheels 54 (FIG. 1) of the vehicle 12 for moving the vehicle 12 in such a manner that the vehicle yaw changes with the vehicle velocity and the steering angle S. In the illustrated embodiment, the power assist steering system 50 is an electric power-assisted steering ("EPAS") system including electric steering motor 52 for turning the steered wheels 54 to a steering angle δ based on a steering command, whereby the steering angle δ may be sensed by a steering angle sensor 56 of the power assist steering system 50. The steering command may be provided by the hitch assist system 10 for autonomously steering during a trailer hitch alignment maneuver and may alternatively be provided manually via a rotational position (e.g., steering wheel angle) of a steering wheel of vehicle 12.

In the illustrated embodiment, the steering wheel of the vehicle 12 is mechanically coupled with the steered wheels 54 of the vehicle 12, such that the steering wheel moves in concert with steered wheels 54, preventing manual intervention with the steering wheel during autonomous steering. More specifically, a torque sensor 58 is provided on the power assist steering system 50 that senses torque on the steering wheel that is not expected from autonomous control of the steering wheel and therefore indicative of manual intervention. In this configuration, the hitch assist system 10 may alert the driver to discontinue manual intervention with the steering wheel and/or discontinue autonomous steering. In alternative embodiments, some vehicles have a power assist steering system 50 that allows a steering wheel to be partially decoupled from movement of the steered wheels 54 of such a vehicle.

With continued reference to FIG. 2, the power assist steering system 50 provides the controller 14 of the hitch assist system 10 with information relating to a rotational position of steered wheels 54 of the vehicle 12, including a steering angle S. The controller 14 in the illustrated embodiment processes the current steering angle, in addition to other vehicle 12 conditions to guide the vehicle 12 along the desired path 20 (FIG. 3). It is conceivable that the hitch assist system 10, in additional embodiments, may be an integrated component of the power assist steering system 50. For example, the power assist steering system 50 may include a hitch assist algorithm for generating vehicle steering information and commands as a function of all or a portion of information received from an imaging system 60, the power assist steering system 50, a vehicle brake control system 62, a powertrain control system 64, and other vehicle sensors and devices, as well as a human-machine interface ("HMI") 66, as discussed further below.

As also illustrated in FIG. 2, the vehicle brake control system 62 may also communicate with the controller 14 to provide the hitch assist system 10 with braking information, such as vehicle wheel speed, and to receive braking commands from the controller 14. The brake control system 62 may be configured to control service brakes 62*a* and a parking brake 62*b*. The parking brake 62*b* may correspond to an electronic parking brake system that may be in communication with the controller 14. Accordingly in operation, the controller 14 may be configured to control the brakes 62*a* and 62*b* as well as detect vehicle speed information, which may be determined from individual wheel speed sensors monitored by the brake control system 62. Vehicle speed may also be determined from the powertrain control system 64, the speed sensor 38, and/or the positioning system 32, among other conceivable means. In some embodiments, individual wheel speeds can also be used to determine a vehicle yaw rate, which can be provided to the hitch assist system 10 in the alternative or in addition to the vehicle yaw rate sensor 40.

The hitch assist system 10 can further provide vehicle braking information to the brake control system 62 for allowing the hitch assist system 10 to control braking of the vehicle 12 during backing of the trailer 18. For example, the hitch assist system 10, in some embodiments, may regulate speed of the vehicle 12 during alignment of the vehicle 12 with the coupler 16 of trailer 18, which can reduce the potential for a collision with trailer 18, and can bring vehicle 12 to a complete stop at a determined endpoint 70 of the path 20. It is disclosed herein that the hitch assist system 10 can additionally or alternatively issue an alert signal corresponding to a notification of an actual, impending, and/or anticipated collision with a portion of trailer 18. As mentioned above, regulation of the speed of the vehicle 12 may be advantageous to prevent collision with trailer 18.

In some embodiments, the powertrain control system 64, as shown in the embodiment illustrated in FIG. 2, may also interact with the hitch assist system 10 for regulating speed and acceleration of the vehicle 12 during partial or autonomous alignment with trailer 18. During autonomous operation, the powertrain control system 64 may further be utilized and configured to control a throttle as well as a drive gear selection of a transmission of the vehicle 12. Accordingly, in some embodiments, the controller 14 may be configured to control a gear of the transmission system and/or prompt the user U to shift to a desired gear to complete semi-automated operations of the vehicle 12.

As previously discussed, the hitch assist system 10 may communicate with human-machine interface ("HMI") 66 of the vehicle 12. The HMI 66 may include a vehicle display 72, such as a center-stack mounted navigation or entertainment display (FIG. 1). HMI 66 further includes an input device, which can be implemented by configuring display 72 as a portion of a touchscreen 74 with circuitry 76 to receive an input corresponding with a location over display 72. Other forms of input, including one or more joysticks, digital input pads, or the like, can be used in place or in addition to touchscreen 74. Further, the hitch assist system 10 may communicate via wireless communication with another embodiment of the HMI 66, such as with one or more handheld or portable devices 80 (FIG. 1), including one or more smartphones. The portable device 80 may also include the display 72 for displaying one or more images and other information to a user U. For instance, the portable device 80 may display one or more images of the trailer 18 on the display 72 and may be further configured to receive remote user inputs via touchscreen circuitry 76. In addition, the portable device 80 may provide feedback information, such as visual, audible, and tactile alerts.

In some embodiments, the hitch assist system 10 may further be in communication with one or more indicator devices 78. The indicator devices 78 may correspond to conventional vehicle indicators, such as a vehicle horn 78*a*, lights 78*b*, a speaker system 78*c*, vehicle accessories 78*d*, etc. In some embodiments, the indicator devices 78 may further include one or more accessories 78*d*, which may correspond to communication devices, remote controls, and a variety of devices that may provide for status and operational feedback between the user U and the vehicle 12. For example, in some embodiments, the HMI 66, the display 72, and the touchscreen 74 may be controlled by the controller 14 to provide status updates identifying the operation or receiving instructions or feedback to control the hitch assist system 10. Additionally, in some embodiments, the portable device 80 may be in communication with the controller 14 and configured to display or otherwise indicate one or more alerts or messages related to the operation of the hitch assist system 10.

Still referring to the embodiment shown in FIG. 2, the controller 14 is configured with a microprocessor 82 to process logic and routines stored in memory 84 that receive information from the above-described sensors and vehicle systems, including the imaging system 60, the power assist steering system 50, the vehicle brake control system 62, the powertrain control system 64, and other vehicle sensors and devices. The controller 14 may generate vehicle steering information and commands as a function of all or a portion of the information received. Thereafter, the vehicle steering information and commands may be provided to the power assist steering system 50 for affecting steering of the vehicle 12 to achieve a commanded path 20 (FIG. 3) of travel for alignment with the coupler 16 of trailer 18. The controller 14 may include the microprocessor 82 and/or other analog and/or digital circuitry for processing one or more routines. Also, the controller 14 may include the memory 84 for storing one or more routines, including an image processing routine 86 and/or hitch detection routine, a path derivation routine 88, and an operating routine 90.

It should be appreciated that the controller 14 may be a stand-alone dedicated controller or may be a shared controller integrated with other control functions, such as integrated with a vehicle sensor system, the power assist steering system 50, and other conceivable onboard or off-board vehicle control systems. It should further be appreciated that the image processing routine 86 may be carried out by a dedicated processor, for example, within a stand-alone imaging system for vehicle 12 that can output the results of its image processing to other components and systems of vehicle 12, including microprocessor 82. Further, any system, computer, processor, or the like, that completes image processing functionality, such as that described herein, may be referred to herein as an "image processor" regardless of other functionality it may also implement (including simultaneously with executing image processing routine 86).

System 10 may also incorporate the imaging system 60 that includes one or more exterior cameras. Examples of exterior cameras are illustrated in FIG. 4 and include rear camera 60*a*, center high-mount stop light (CHMSL) camera 60*b*, and side-view cameras 60*c* and 60*d*, although other arrangements including additional or alternative cameras are possible. In one example, imaging system 60 can include rear camera 60*a* alone or can be configured such that system 10 utilizes only rear camera 60*a* in a vehicle with multiple exterior cameras. In another example, the various cameras 60*a*-60*d* included in imaging system 60 can be positioned to generally overlap in their respective fields of view, which in the depicted arrangement include fields of view 92*a*, 92*b*, 92*c*, and 92*d* to correspond with rear camera 60*a*, center high-mount stop light (CHMSL) camera 60*b*, and side-view cameras 60*c* and 60*d*, respectively. In this manner, image data from two or more of the cameras can be combined in image processing routine 86, or in another dedicated image processor within imaging system 60, into a single image.

As an example of combining image data from multiple cameras, the image data can be used to derive stereoscopic image data that can be used to reconstruct a three-dimensional scene of the area or areas within overlapped areas of the various fields of view 92*a*, 92*b*, 92*c*, and 92*d*, including any objects (obstacles or coupler 16, for example) therein. In an embodiment, the use of two images including the same object can be used to determine a location of the object relative to the two image sources, given a known spatial relationship between the image sources. In this respect, the image processing routine 86 can use known programming and/or functionality to identify an object within image data from the various cameras 60*a*, 60*b*, 60*c*, and 60*d* within imaging system 60. In either example, the image processing routine 86 can include information related to the positioning of any cameras 60*a*, 60*b*, 60*c*, and 60*d* present on vehicle 12 or utilized by system 10, including relative to a center 96 (FIG. 1) of vehicle 12, for example, such that the positions of cameras 60*a*, 60*b*, 60*c*, and 60*d* relative to center 96 and/or to each other can be used for object positioning calculations and to result in object position data relative to the center 96 of vehicle 12, for example, or other features of vehicle 12, such as hitch ball 22 (FIG. 1), with known positions relative to center 96 of the vehicle 12.

The image processing routine 86 can be specifically programmed or otherwise configured to locate coupler 16 within image data. In one example, the image processing routine 86 can identify the coupler 16 within the image data based on stored or otherwise known visual characteristics of coupler 16 or hitches in general. In another embodiment, a marker in the form of a sticker, or the like, may be affixed with trailer 18 in a specified position relative to coupler 16 in a manner similar to that which is described in commonly-assigned U.S. Pat. No. 9,102,271, the entire disclosure of which is incorporated by reference herein. In such an embodiment, image processing routine 86 may be programmed with identifying characteristics of the marker for location in image data, as well as the positioning of coupler 16 relative to such a marker so that the position 24 of coupler 16 can be determined based on the marker location.

Additionally or alternatively, controller 14 may seek confirmation of the determined coupler 16, via a prompt on touchscreen 74. If the coupler 16 determination is not confirmed, further image processing may be provided, or user-adjustment of the position 24 of coupler 16 may be facilitated, either using touchscreen 74 or another input to allow the user U to move the depicted position 24 of coupler 16 on touchscreen 74, which controller 14 uses to adjust the determination of position 24 of coupler 16 with respect to vehicle 12 based on the above-described use of image data. Alternatively, the user U can visually determine the position 24 of coupler 16 within an image presented on HMI 66 and can provide a touch input in a manner similar to that which is described in, commonly-assigned U.S. patent Ser. No. 10,266,023, the entire disclosure of which is incorporated by reference herein. The image processing routine 86 can then correlate the location of the touch input with the coordinate system 36 applied to image data shown on the display 72, which may be depicted as shown in FIG. 3.

As shown in FIG. 3, the image processing routine 86 and operating routine 90 may be used in conjunction with each other to determine the path 20 along which hitch assist system 10 can guide vehicle 12 to align hitch ball 22 and coupler 16 of trailer 18. In the example shown, an initial position of vehicle 12 relative to trailer 18 may be such that coupler 16 is only in the field of view 92*c* of side camera 60*c*, with vehicle 12 being positioned laterally from trailer 18 but with coupler 16 being almost longitudinally aligned with hitch ball 22. In this manner, upon initiation of hitch assist system 10, such as by user input on touchscreen 74, for example, image processing routine 86 can identify coupler 16 within the image data of camera 60*c* and estimate the position 24 of coupler 16 relative to hitch ball 22. The position 24 of the coupler 16 may be identified by the system 10 using the image data in accordance by receiving focal length information within image data to determine a distance $D_c$ to coupler 16 and an angle $\alpha_c$ of offset between coupler 16 and the longitudinal axis of vehicle 12. This information can then be used in light of the position 24 of coupler 16 within the field of view of the image data to determine or estimate the height $H_c$ of coupler 16. Once the positioning $D_c$, $\alpha_c$ of coupler 16 has been determined and, optionally, confirmed by the user U, the controller 14 can take control of at least the vehicle steering system 50 to control the movement of vehicle 12 along the desired path 20 to align the hitch position 26 of the vehicle hitch ball 22 with coupler 16.

Continuing with reference to FIGS. 3 and 4 with additional reference to FIG. 2, controller 14, having estimated the positioning $D_c$, $\alpha_c$ of coupler 16, as discussed above, can, in one example, execute path derivation routine 88 to determine vehicle path 20 to align the vehicle hitch ball 22 with coupler 16. In particular, controller 14 can have stored in memory 84 various characteristics of vehicle 12, including the wheelbase W, the distance from the rear axle to the hitch ball 22, which is referred to herein as the drawbar length L, as well as the maximum angle to which the steered wheels 54 can be turned $\delta_{max}$. As shown, the wheelbase W and the current steering angle δ can be used to determine a corresponding turning radius p for vehicle 12 according to the equation:

$$\rho = \frac{1}{W\tan\delta}, \tag{1}$$

in which the wheelbase W is fixed and the steering angle δ can be controlled by controller 14 by communication with steering system 50, as discussed above. In this manner, when the maximum steering angle $\delta_{max}$ is known, the smallest possible value for the turning radius prim, is determined as:

$$\rho_{min} = \frac{1}{W\tan\delta_{max}}. \tag{2}$$

Path derivation routine 88 can be programmed to derive vehicle path 20 to align a known location of the vehicle hitch ball 22 with the estimated position 24 of coupler 16 that takes into account the determined minimum turning radius $\rho_{min}$ to allow path 20 to use the minimum amount of space and maneuvers. In this manner, path derivation routine 88 can use the position of vehicle 12, which can be based on the center 96 of vehicle 12, a location along the rear axle, the location of the dead reckoning device 34, or another known location on the coordinate system 36, to determine both a lateral distance to the coupler 16 and a forward or rearward distance to coupler 16 and derive a path 20 that achieves the needed lateral and forward-backward movement of vehicle 12 within the limitations of steering system 50. The derivation of path 20 further takes into account the positioning of hitch ball 22, based on length L, relative to the tracked location of vehicle 12 (which may correspond with the center 96 of mass of vehicle 12, the location of a GPS receiver, or another specified, known area) to determine the needed positioning of vehicle 12 to align hitch ball 22 with coupler 16.

Figure 5:
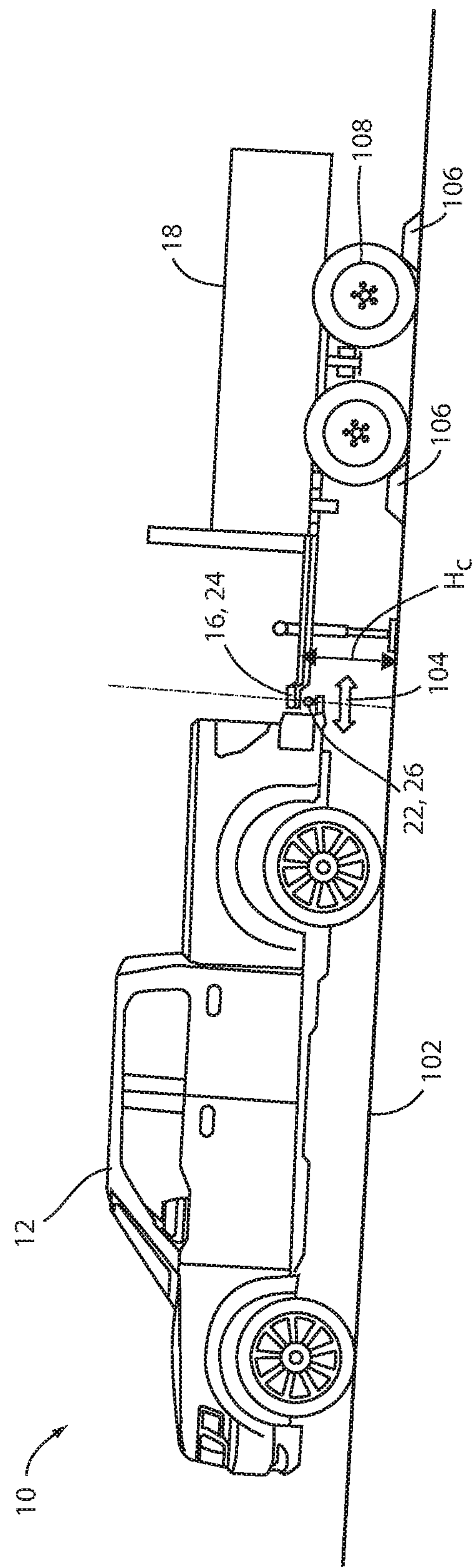
FIG. 5 is a side view of a vehicle aligned with a trailer demonstrating an automated vehicle stop routine.

Referring now to FIG. 5, a side profile view of the vehicle 12 in connection with the trailer 18 is shown demonstrating the vehicle 12 on an incline 102. In such circumstances, the vehicle 12 may be particularly susceptible to lunging backward or more generally in the direction of gravity as illustrated by the arrows 104. Although the incline 102 is demonstrated as a significant grade, similar motion as demonstrated by the arrows 104 may occur when positioning the vehicle 12 on relatively flat ground due to an incomplete stop of the motion of the vehicle 12, slippage of a parking gear of the powertrain control system 64, or various other instabilities that may result in motion of the vehicle 12. In order to prevent such motion, the controller 14 may be configured to control the brake control system 62 and the powertrain control system 64 to complete an automated vehicle stop routine. In this way, the system 10 may accurately position the hitch ball 22 aligned with the coupler 16 and maintain the alignment while the height $H_c$ of the coupler 16 is adjusted to interconnect the hitch ball 22 to the coupler 16.

As demonstrated in FIG. 5, the automated vehicle stop routine disclosed herein may be particularly beneficial in situations wherein the vehicle 12 is approaching the trailer 18 on the incline 102. In such circumstances, a position of the trailer 18 may be accurately maintained by positioning wheel chocks 106 against the trailer wheels 108. However, the use of wheel chocks 106 to prevent the motion of the vehicle 12 would prevent the hitch assist system 10 being free to position the location of the vehicle 12. Accordingly, the controller 14 may be configured to automatically apply the service brakes 62*a* and engage the parking brake 62*b* until the powertrain control system 64 adjusts the transmission of the vehicle into a parking gear. Once the vehicle 12 is configured in the parking gear and the parking brake 62*b* is engaged, the controller 14 may disengage the service brakes 62*a*. In this way, the hitch assist system 10 may be configured to accurately position the vehicle 12 to maintain the alignment between the hitch ball 22 and the coupler 16.

Figure 6:
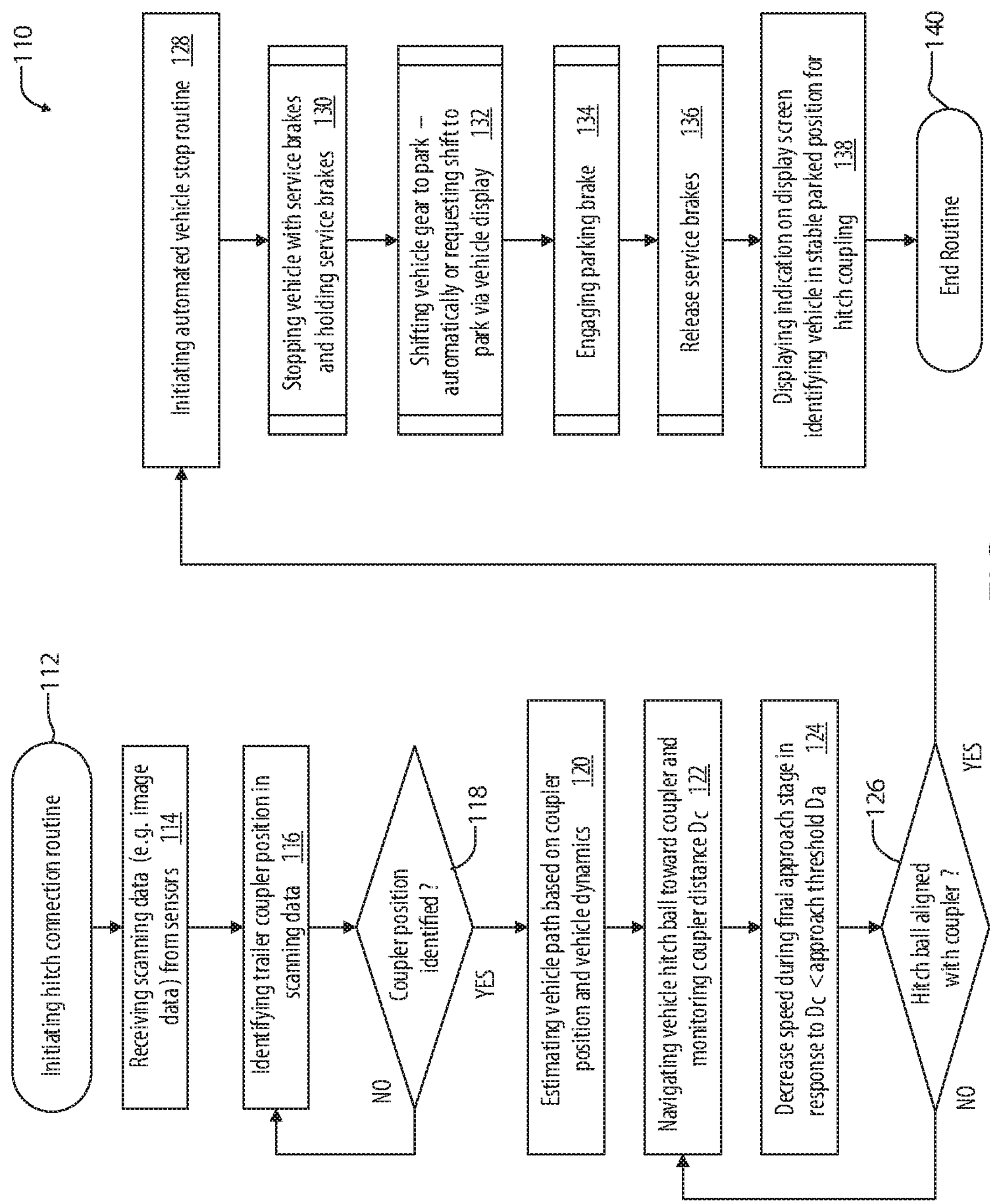
FIG. 6 is a flow chart demonstrating an automated vehicle stop routine in accordance with the disclosure.

Referring now to FIG. 6, a flowchart is shown demonstrating a method 110 for initiating a hitch connection routine including an automated stop routine 120. The method 110 may begin by initiating the hitch connection routine in step 112. The hitch connection routine may begin by receiving scanning data (e.g., image data from the imaging system 60) (114). From the image data, the controller 14 may continue the method 110 by identifying the coupler position 24 in the image data (116). If the coupler position 24 is identified in step 108, the controller 14 may continue by estimating the vehicle path 20 based on the coupler position 24 and the dynamics of the vehicle 12 (120). If the coupler position 24 is not identified in step 118, the controller 14 may return to step 116 to scan the image data to identify the coupler position 24.

Once the controller 14 has identified the vehicle path 20, the controller 14 may navigate the vehicle 12, more specifically the hitch ball 22, toward the coupler 16 while monitoring the coupler distance $D_c$ (122). In response to the coupler distance $D_c$ being less than an approach threshold $D_a$, the controller 14 may control the vehicle 12 to decrease speed during a final approach stage of the hitch connection routine (124). The approach threshold $D_a$ may correspond to a predetermined distance wherein the hitch position 26 is proximate to the coupler position 24 as identified by the controller 14. In step 126, the controller 14 may determine if the vehicle path 20 is complete thereby aligning the hitch position 26 with the coupler position 24. If the hitch ball 22 is aligned with the coupler 16 in step 126, the controller 14 may continue the method 110 by initiating the automated vehicle stop routine (128). If the hitch is not aligned with the coupler in step 126, the controller 14 may continue navigating the vehicle 12 in step 122.

The automated vehicle stop routine 128 may begin by stopping the vehicle and maintaining or holding an activation of the service brakes 62*a* (130). While the service brakes 62*a* are held, the controller 14 may continue by controlling the gear selection of the vehicle 12 to a parking gear or requesting that the user U shift the vehicle 12 to the parking gear (132). In order to request that the user U shift the vehicle 12 into the parking gear, the controller 14 may display an instruction on the display 72 prompting the user U to shift the vehicle 12. Additionally, while holding the activation of the service brakes 62*a*, the controller 14 may control the brake control system 62 to activate the parking brake 62*b* (134). Finally, with the vehicle 12 configured in a parking gear and with the parking brake 62*b* engaged, the controller 14 may release the service brakes 62*a* (136). In this way, the controller 14 may automatically control the hitch assist system 10 to position and hold the vehicle 12 with the hitch ball 22 aligned with the coupler 16. Although steps 132 and 134 are described in a specific order, it shall be understood that the controller 14 may complete steps 132 and 134 in a different order while achieving a similar result for the automated vehicle stop routine 128.

After the service brakes 62*b* are released in step 136, the controller 14 may display an indication on the display 72 identifying that the vehicle 12 is in a stable, parked position for hitch coupling (138). Additionally, the controller 14 may provide further instructions or information regarding specific steps required to connect the coupler 16 to the hitch ball 22 following step 138. With the vehicle 12 successfully positioned with the hitch ball 22 aligned with the coupler 16, the hitch connection routine and the automated vehicle stop routine 128 may be completed in step 140. Accordingly, the hitch assist system 10 may provide for accurate positioning of the vehicle 12 and the hitch ball 22 to maximize the ease of connecting the coupler 16 of the trailer 18 to the hitch ball 22 of the vehicle 12.

It is to be understood that variations and modifications can be made on the aforementioned structure without departing from the concepts of the present disclosure, and further it is to be understood that such concepts are intended to be covered by the following claims unless these claims by their language expressly state otherwise.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A vehicle system configured to control a trailer alignment routine, comprising:
- a hitch ball mounted on a vehicle; and
- a controller that:
  - identifies a coupler position of a trailer;
  - controls motion of the vehicle to an aligned position, wherein the hitch ball is aligned with the coupler position;
  - in response to the aligned position, holds the vehicle by activating a service brake;
  - in response to the vehicle stopped in the aligned position and while maintaining the service brake activation, activates a parking brake; and
  - releases the service brake in response to the activation of the parking brake and a transmission in a parking configuration.

2. The system according to claim 1, wherein the service brake is applied maintaining the aligned position, thereby preventing a drift in the transmission of the vehicle in a parked configuration.

3. The system according to claim 1, wherein the controller further:
- controls the transmission of the vehicle to engage a parking configuration.

4. The system according to claim 1, further comprising:
- a display system and a user interface, wherein the controller controls the trailer alignment routine in response to at least one input received via the user interface.

5. The system according to claim 4, wherein the controller further:
- displays an instruction prompting an operator of the vehicle to shift the vehicle into park while maintaining the service brake activation.

6. The system according to claim 1, further comprising:
- a sensor apparatus in communication with the controller, wherein the sensor apparatus is configured to scan a region proximate the vehicle and detect the coupler position of a coupler of the trailer.

7. The system according to claim 6, wherein the sensor apparatus comprises an imaging system including one or more cameras mounted on the vehicle; wherein the controller identifies the coupler position based on image data received from the imaging system comprising position data of the coupler.

8. The vehicle system of claim 1, further comprising:
- a brake system comprising the service brake and the parking brake, wherein the controller automatically controls the brake system to control the alignment routine.

9. The vehicle system of claim 1, further comprising:
- a steering system comprising a steering motor configured to maneuver a steered wheel of the vehicle, wherein the controller controls the steering motor to maneuver the vehicle according to the alignment routine.

10. The system according to claim 1, wherein the coupler position is a location of a coupler of the trailer, wherein the coupler is configured to mate to the hitch ball in a towing configuration.

11. A method for controlling a vehicle comprising:
- identifying a coupler position of a trailer in sensor data;
- controlling motion of the vehicle to an aligned position aligning a hitch ball with the coupler position;
- in response to reaching the aligned position, holding the vehicle by activating a service brake; and
- while maintaining the service brake activation and in response to the vehicle stopped in the aligned position, controlling the vehicle to sustain the aligned position, wherein controlling the vehicle to sustain the aligned position comprises:
  - automatically activating a parking brake; and
  - automatically controlling a transmission of the vehicle into a parked configuration.

12. The system according to claim 1, wherein the controller further controls the transmission of the vehicle into a parked configuration in response to the vehicle stopped in the aligned position and while maintaining the service brake activation.

13. The method according to claim 11, further comprising:
- monitoring the transmission and the parking brake; and
- releasing the service brake in response to an activation of the parking brake in combination with the transmission in the parking configuration.

14. The method according to claim 11, wherein the service brake is applied maintaining the aligned position, thereby preventing a drift in the transmission of the vehicle sustaining the aligned position.

15. A vehicle system configured to control a trailer alignment routine, comprising:
- a hitch ball mounted on a vehicle;
- a controller that:

identifies a coupler position of a trailer;

controls motion of the vehicle to an aligned position, wherein the hitch ball is aligned with the coupler position;

in response to the aligned position, holds the vehicle by activating a service brake, wherein the service brake is applied maintaining the aligned position, thereby preventing a drift in a transmission of the vehicle in a parked configuration; and while maintaining the service brake activation:

activates a parking brake; and controls the transmission of the vehicle to engage a parking configuration.

16. The system according to claim 15, wherein the controller further:

deactivates the service brake in response to the activation of the parking brake in combination with the transmission of the vehicle in the parking configuration.

* * * * *